Oct. 8, 1935.    J. S. TOWNSEND    2,016,947
CLAMPING DEVICE
Filed June 28, 1934
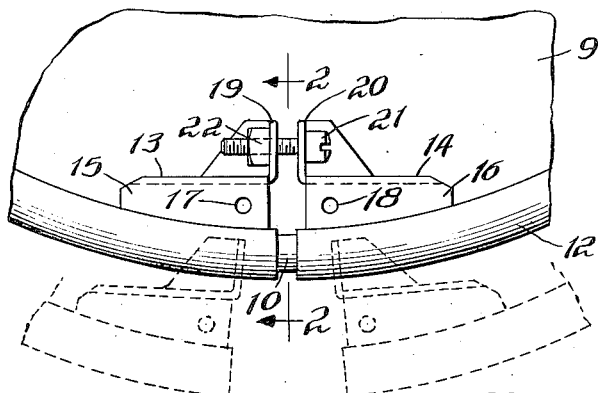
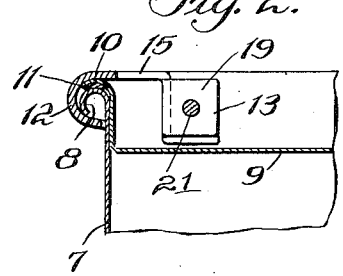
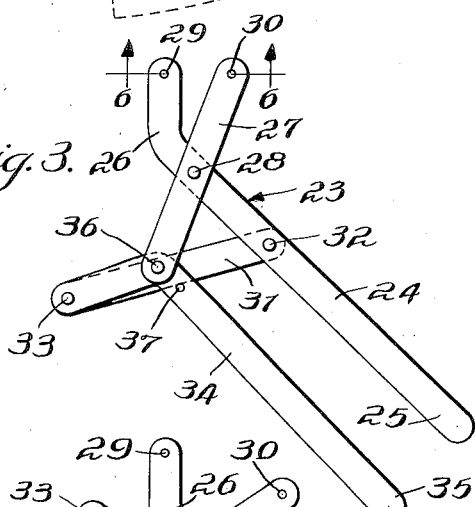
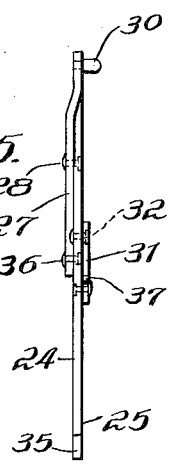
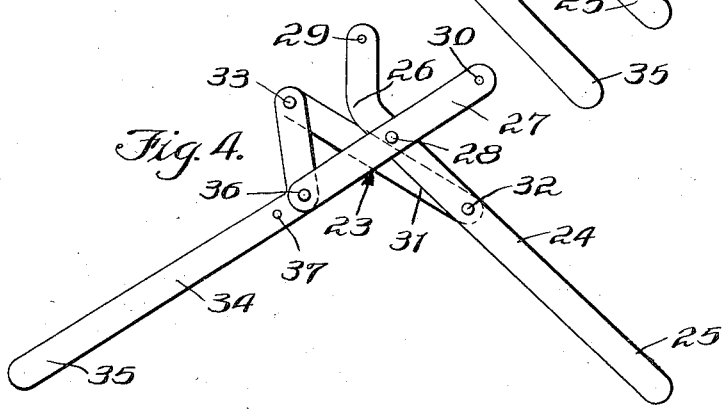
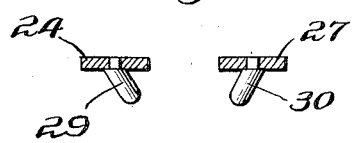
INVENTOR.
John S. Townsend
BY Glenn S. Noble
ATTORNEY.

Patented Oct. 8, 1935

2,016,947

UNITED STATES PATENT OFFICE 2,016,947

CLAMPING DEVICE

John S. Townsend, Chicago, Ill., assignor to Wilson & Bennett Mfg. Co., Chicago, Ill., a corporation of Illinois Application June 28, 1934, Serial No. 732,800

4 Claims. (Cl. 254—77)

This invention relates to clamps or fastening rings for containers and particularly to those known as full removable head barrels and to means for closing and fastening the rings preparatory to applying the regular or permanent fastening devices.

Various types of clamps or clamping rings have been proposed and used for clamping the covers on pails, barrels or drums. Some of these rings are provided with lever actuated means for drawing the ends of the ring into clamping position and fastening the same, and others are provided with screws or bolts for such purposes. While the lever actuated means are usually quick to apply they are more or less expensive and liable to become injured or get out of order. While bolts provide simple means for drawing the ends together, comparatively long bolts are necessary in order to take up the spring or slack in the rings, such bolts therefore are difficult to apply and considerable time is necessary to screw the same to closing position.

In accordance with the present invention I provide a novel clamp or clamping ring with auxiliary means for drawing the ends together and holding the same while the bolt or fastening member is applied.

The objects of this invention other than as above indicated are to provide an improved clamp for fastening covers on barrels or containers and to provide a novel tool or clamping device for drawing the ends of such clamp together preparatory to placing the fastening member in position. Other objects and advantages will appear from the following description taken in connection with the accompanying drawing, in which, Figure 1 is a plan view showing a portion of a barrel with the clamping ring applied thereto and also showing the ends of the clamping ring in dotted lines in the position which they may assume prior to being drawn together;

Figure 2 is a sectional view taken on the line 2—2 of Figure 1;

Figure 3 is a plan view of the clamping device or detachable ring contracting mechanism shown in closed position;

Figure 4 is a similar view showing the tool or ring tightener in open position;

Figure 5 is a side view; and

Figure 6 is a sectional detail taken on the line 6—6 of Figure 3.

The barrel 7 shown in the drawing is illustrative of the type for which my improved clamping device is intended. The barrel has a bead or flange 8 at the top and is provided with a cover 9 having a flange 10 which projects outwardly over the bead 8. A gasket 11 is usually interposed between the parts 8 and 10 to make a tight closure, this gasket also serving to provide a certain amount of yield or resiliency in the closing operation. The clamp or ring 12 is approximately semi-circular in cross section or shaped so that when it is drawn tightly around the head of the barrel, the flange 10 and bead 8 will be drawn toward each other and will compress the gasket 11. The ring is of the contractible or split type and I provide lugs or brackets 13 and 14 adjacent to the ends. These brackets may be formed integrally with the ring or may be applied thereto preferably by being welded to the upper edge of the ring. In the form shown the brackets are made of sheet metal and have flat ledges or plate portions 15 and 16 lying in the same plane as the upper edge of the ring, these ledges having holes 17 and 18 for receiving the tightening or clamping tool. The brackets also have downwardly and inwardly extending projections 19 and 20 with holes for the fastening bolt or screw 21. These bolts are preferably of the filister head type and have nuts 22 which engage with the sides or lower portions of the bracket in order to prevent turning.

It will be understood that these rings or clamping members are comparatively stiff and when they are sprung over the tops of the barrels the ends are separated for a substantial distance, for instance, as indicated by the dotted lines in Figure 1. In order to draw the ends together to clamp the rings tightly in position, I provide a tool or tightener such as indicated generally by the numeral 23. This tool comprises a lever 24 having a handle portion 25 at one end and being bent as shown at 26 adjacent to the opposite end. A lever 27 is pivoted at 28 to the lever 24. Pins or lugs 29 and 30 are provided at the adjacent ends of the levers 24 and 27 for engagement with the holes 17 and 18 in the ring brackets. These pins are preferably arranged at an angle or converging as indicated in Figure 6, to insure positive holding in the brackets. A link 31 is pivoted to the lever 24 at 32 and its other end is pivoted at 33 to one end of a bell crank or bent lever 34, the long branch of which provides a handle portion 35. The lever 34 is pivoted at the bend to the end of the lever 27 as shown at 36.

In the operation of the device, the handles 25 and 35 are spread apart as shown in Figure 4 and the pins 29 and 30 are inserted in the holes 17 and 18 in the ring brackets. The handles are then pressed toward each other, or one handle is held stationary and the other moved so as to swing the pins 29 and 30 toward each other or to the position shown in Figure 3. This will draw the ends of the ring closely together or preferably into final closing and clamping position. It will be noted that the link 31 and the short end of the lever 34 act as a toggle so that extreme force may be applied at the ends of the closing movement. In order to hold the tightener in closed position the pivot 36 preferably is arranged to pass the dead center between the pivots 32 and 33 and a pin or lug 37 is arranged on the lever 34 to prevent the further movement of these parts. After the operator has moved the handles toward each other to close the ring and to lock the clamping device it will hold the ends of the ring while he inserts the fastening bolt 31 and screws the bolt to holding position. It will be seen that by means of this arrangement a comparatively short bolt may be used and the bolt may be quickly tightened as it is not necessary to utilize the same for drawing the ends of the ring together. As soon as the bolt is placed in position the handles 25 and 35 are separated sufficiently to release the catch pins 29 and 30 and the device may then be removed.

From this description it will be seen that I provide a simple and inexpensive clamp or clamping ring for the purposes indicated and furthermore by means of my improved clamping device or tool these rings may be quickly and effectively applied inasmuch as comparatively light force is necessary to draw the ring to closing position, due to the unique arrangement of the levers of the clamping tool.

Any improvements shown and described herein but not claimed are not intended to be abandoned or dedicated to the public, some of such improvements being shown and claimed in my co-pending application for Closures for barrels, Serial No. 746,653.

While I have illustrated a preferred form of my invention it will be understood that the same may be modified without departing from the scope thereof as set forth in the following claims, in which I claim:

1. A clamping tool for the purposes set forth, comprising a pair of levers which are pivoted together, pins at the ends of said levers for engagement with the parts to be drawn together, and toggle lever mechanism coacting with the first named levers for drawing the free ends together.

2. A ring tightener comprising a bent lever having a pin at one end and a handle portion at the opposite end, a second lever pivoted to the first named lever adjacent to the bend and having a pin at the free end thereof, a link having one end pivoted to the first named lever at a point between said pivot and the handle, a second bent lever pivotally connected to the second lever and having one end pivoted to the link and the other end extended to provide a handle portion.

3. A tool of the character set forth, comprising a lever having an obliquely arranged pin at one end and a handle at the opposite end, a second lever pivoted to the first named lever and having an obliquely arranged pin at the free end thereof, a link having one end pivoted to the first named lever, a third lever having one end pivoted to the free end of the link and pivotally connected to the end of the second named lever and having a handle portion, said link and coacting levers forming a toggle, and a stop for limiting the movement of the toggle members after they have passed slightly beyond dead center.

4. A tool for drawing the ends of a clamping ring together and holding them in clamping position, comprising a plurality of coacting levers with means for engagement with the ends of the ring, said levers including toggle portions which move beyond dead center when the ends of the ring are drawn to closing position and means associated with said levers for preventing further movement of the toggle portion, the arrangement being such that the tool will hold the ends of the ring in closed position when the toggle has passed slightly beyond dead center.

JOHN S. TOWNSEND.